United States Patent
Park et al.

(10) Patent No.: US 8,119,274 B2
(45) Date of Patent: Feb. 21, 2012

(54) STACKING-TYPED SECONDARY BATTERY PROVIDING TWO OR MORE OPERATION VOLTAGES

(75) Inventors: Hey Woong Park, Daejeon (KR); Seungtaek Hong, Seoul (KR); Ra Young Hwang, Daejeon (KR); Jisang Yu, Daejeon (KR); John E. Namgoong, Daejeon (KR)

(73) Assignee: LG Chem, Ltd. (KR)

( * ) Notice: Subject to any disclaimer, the term of this patent is extended or adjusted under 35 U.S.C. 154(b) by 91 days.

(21) Appl. No.: 12/308,318

(22) PCT Filed: Jun. 5, 2007

(86) PCT No.: PCT/KR2007/002710
§ 371 (c)(1),
(2), (4) Date: Apr. 8, 2010

(87) PCT Pub. No.: WO2007/145441
PCT Pub. Date: Dec. 21, 2007

(65) Prior Publication Data
US 2010/0190081 A1    Jul. 29, 2010

(30) Foreign Application Priority Data

Jun. 13, 2006    (KR) .................. 10-2006-0052776

(51) Int. Cl.
*H01M 10/04*    (2006.01)
*H01M 10/052*    (2010.01)

(52) U.S. Cl. .......................... 429/152; 429/153
(58) Field of Classification Search .......... 429/152, 429/153
See application file for complete search history.

(56) References Cited

U.S. PATENT DOCUMENTS

| 5,674,641 | A | * | 10/1997 | Cheu ............................ 429/306 |
| 5,814,968 | A |   | 9/1998  | Lovegreen et al. |
| 6,045,942 | A | * | 4/2000  | Miekka et al. ................ 429/124 |

FOREIGN PATENT DOCUMENTS

| JP | 59018576 A | * | 1/1984 |
| JP | 7-14568 A  |   | 1/1995 |
| JP | 2002-124303 A |  | 4/2002 |
| JP | 2003-331813 A |  | 11/2003 |
| KR | 20010082058  |  | 8/2001 |
| KR | 20010082059  |  | 8/2001 |
| KR | 20010082060  |  | 8/2001 |

* cited by examiner

*Primary Examiner* — Gregg Cantelmo
(74) *Attorney, Agent, or Firm* — Lerner, David, Littenberg, Krumholz & Mentlik, LLP

(57) ABSTRACT

Provided is a stacked-type secondary battery comprising a battery cell formed by stacking a plurality of full cells having a structure of cathode/separator/anode or bicells having a structure of cathode(anode)/separator/anode(cathode)/separator/cathode(anode), as a unit electrode assembly, wherein a cathode active material and/or an anode active material in two or more unit electrode assemblies are configured to have a different composition to induce a voltage difference and separate electrode terminals are installed in a battery case according to the voltage difference to thereby simultaneously provide two or more voltages by a single battery.

9 Claims, 3 Drawing Sheets

STACKING-TYPED SECONDARY BATTERY PROVIDING TWO OR MORE OPERATION VOLTAGES

CROSS REFERENCE TO RELATED APPLICATIONS

The present application is a national phase entry under 35 U.S.C. §371 of International Application No. PCT/KR2007/002710, filed Jun. 5, 2007, published in English, which claims priority from Korean Patent Application No. 10-2006-0052776, filed Jun. 13, 2006. The disclosures of said applications are incorporated by reference herein.

FIELD OF THE INVENTION

The present invention relates to a stacked-type secondary battery. More particularly, the present invention relates to a secondary battery comprising a battery cell formed by stacking a plurality of full cells having a structure of cathode/separator/anode or bicells having a structure of cathode(anode)/separator/anode(cathode)/separator/cathode(anode) as a unit electrode assembly, wherein a cathode active material and/or an anode active material in two or more unit electrode assemblies have a different composition and therefore two or more voltages can be simultaneously supplied by provision of two or more electrode terminals outside the battery cell.

BACKGROUND OF THE INVENTION

Technological development and increased demand for mobile equipment have led to a rapid increase in the demand for secondary batteries as an energy source. Among these secondary batteries, a great deal of research and study has been focused on lithium secondary batteries having a high-energy density and a high-discharge voltage and consequently some of such lithium secondary batteries are commercially available and widely used.

The lithium secondary battery refers to a battery comprising an electrode assembly composed of a cathode containing a cathode active material capable of undergoing intercalation/deintercalation of lithium ions, an anode containing an anode active material capable of undergoing intercalation/deintercalation of lithium ions, and a microporous separator disposed between the cathode and anode, in conjunction with a lithium ion-containing non-aqueous electrolyte.

For example, as the cathode active material for the lithium secondary battery, mention may be made of primarily transition metal oxides such as lithium cobalt oxide ($LiCoO_2$), lithium manganese oxide ($LiMn_2O_4$), lithium nickel oxide ($LiNiO_2$), or composite oxides wherein a portion of such a transition metal in the oxide is substituted with other transition metals. In addition, as the anode active material, amorphous carbon-based materials and crystalline carbon-based materials are largely used with recently active investigation on utilization of silicon-based materials as the anode active material.

Such a secondary battery is broadly divided into a jelly-roll (winding) type and an overlap (stacking) type, depending upon a construction form of the electrode assembly composed of cathode/separator/anode. The jelly-roll type electrode assembly is fabricated by coating an electrode active material on metal foil as a current collector, pressing and cutting the resulting structure into a band form having a desired width and length, and isolating the cathode and the anode using a separator, followed by spiral winding. The jelly-roll type electrode assembly is suitable for cylindrical batteries, but suffers from various problems such as separation of the electrode active materials from electrodes and poor spatial utilization and efficiency, upon application thereof to a prismatic or pouch-type battery.

The more advanced stacked-type electrode assembly, which is capable of solving the aforementioned disadvantages and problems, as detailed in Korean Patent Application Publication Nos. 2001-82058 A1, 2001-82059 A1 and 2001-82060 A1, assigned to the present applicant, is configured to have a structure in which full cells of cathode/separator/anode having a given size or bicells of cathode(anode)/separator/anode(cathode)/separator/cathode(anode) having a given size are sequentially stacked such that the cathode and the anode are arranged opposite to each other with a separator therebetween.

Generally, the secondary battery is fabricated by putting the electrode assemblies, having various configurations as described above, into a cylindrical or prismatic metal can or a pouch-type sheet case, and sealing the resulting structure with exposure of an electrode terminal pair of the cathode and anode to the outside of the battery case. Therefore, one battery cell is configured to supply only a specific voltage within a given range. Some of conventional prior arts provide a structure having formation of two or more electrode terminals on the outside of the battery case so as to enhance power output efficiency, but the voltage provided from the overall battery cell is still constant.

Whereas, as electric/electronic devices are developed into highly various forms, there may also be necessary devices having a configuration requiring one or more operation voltages depending upon desired operation modes. For implementation of such a device requiring two or more operation voltages, a currently available technique is only a method involving a combined use of two or more secondary batteries having different operation voltages set to each other.

As an attempt to provide two operation voltages from one battery, Japanese Unexamined Patent Publication No. 2003-331813 discloses a battery having two battery cells (A, B) within one battery case in an isolated state from one another, wherein electrode terminals for each battery cell (A, B) are exposed to the outside. The aforesaid Japanese Patent is characterized in that the battery is configured, for example, by divisional arrangement of a 1.5 V-power battery cell (A) and another 1.5 V-power battery cell (B) within one battery case, and connection of a cathode terminal and an anode terminal to each of the battery cells (A, B), such that a desired voltage can be achieved using the aforementioned single battery without a need for a series connection of two 1.5 V batteries, upon use of the battery in the device operating at 3.0 V.

However, the battery of the above-mentioned Japanese Patent has an effect of using no members necessary for construction of a battery module, such as a spacer, by simple installation of two battery cells inside the battery case, but provides substantially no different voltages between two battery cells. Based on the disclosure of the above Japanese Patent, there may be considered to configure the battery such that the battery cell (A) and the battery cell (B') provide different voltages therebetween. For this purpose, there are, however, fundamental problems such as a need for a separate structure for divisional arrangement of the battery cells (A, B') inside the battery case.

Consequently, there is a need for the development of a technology that is capable of providing a plurality of voltages from one battery without a significant modification of the structure in a conventional secondary battery.

SUMMARY OF THE INVENTION

Therefore, the present invention has been made to solve the above problems, and other technical problems that have been desired to be solved from the past.

As a result of a variety of extensive and intensive studies and experiments to solve the problems as described above, the inventors of the present invention have surprisingly discovered that it is possible to provide a plurality of voltages from one battery without a modification in the internal structure of a battery case, via the construction of the battery with installation of electrode terminals according to the corresponding voltages, upon fabrication of an electrode assembly by stacking unit electrode assemblies wherein a portion or total of the unit electrode assemblies, in the stacked electrode assembly based on the full cell or bicell proposed already in the aforementioned Korean Patent Applications of the present applicant, is configured to have a different composition of active materials so as to provide various voltages. The present invention has been completed based on these findings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

In accordance with an aspect of the present invention, the above and other objects can be accomplished by the provision of a stacked-type secondary battery comprising a battery cell formed by stacking a plurality of full cells having a structure of cathode/separator/anode or bicells having a structure of cathode(anode)/separator/anode(cathode)/separator/cathode (anode), as a unit electrode assembly, wherein a cathode active material and/or an anode active material in two or more unit electrode assemblies are configured to have a different composition to induce a voltage difference and separate electrode terminals are installed in a battery case according to the voltage difference to thereby simultaneously provide two or more voltages by a single battery.

Figure 1:
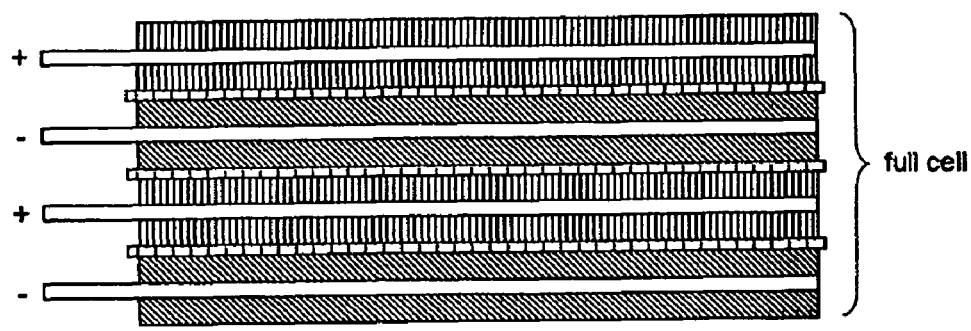
FIG. 1 is a schematic view of a full cell having a structure of cathode/separator/anode/separator/cathode/separator/anode.
Figure 2:
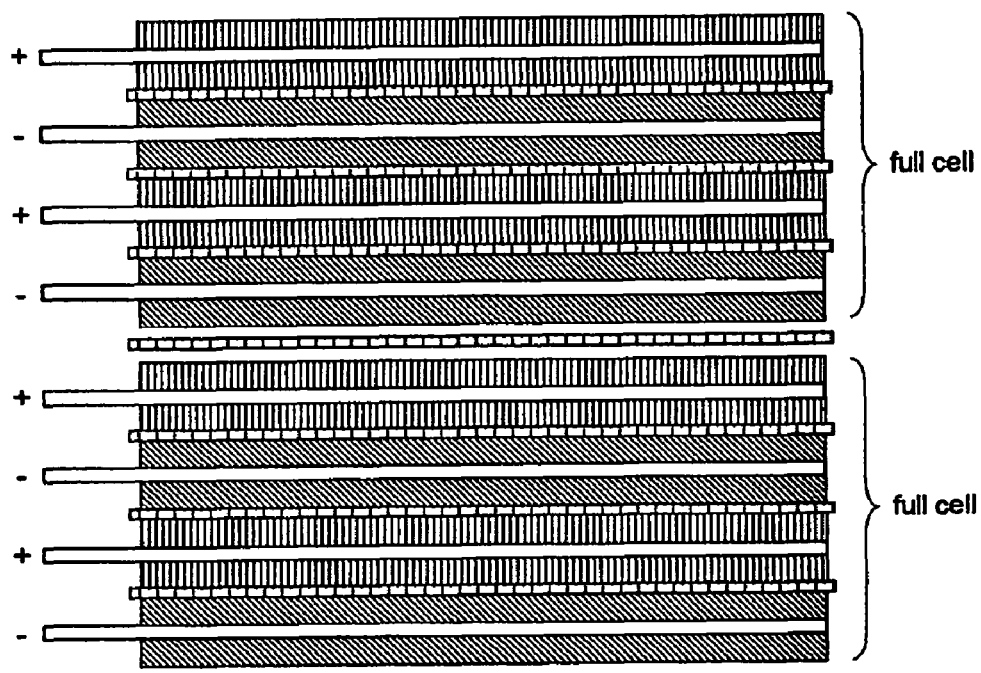
FIG. 2 is a schematic view of an exemplary battery cell, as constructed using the full cell of FIG. 1.

The full cell is a unit cell having different electrodes on both ends of the electrode assembly, and may be fabricated in the form of cathode/separator/anode/separator/cathode/separator/anode using cathode/separator/anode as a basic structure. FIG. 1 shows a schematic view of a full cell having a structure of cathode/separator/anode/separator/cathode/separator/anode as an illustrative structure of the full cell. Therefore, one battery cell can be fabricated by stacking a plurality of full cells with the interposition of separators therebetween, and FIG. 2 shows an exemplary structure of such a battery cell configuration.

Figure 3:
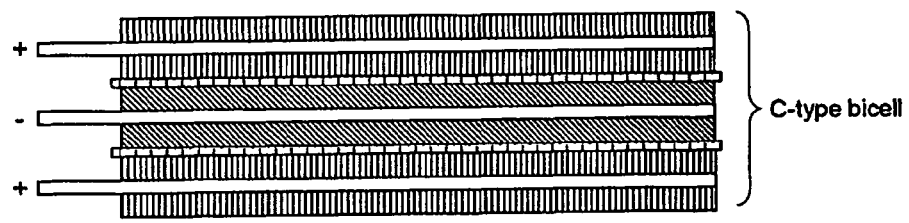
FIG. 3 is a schematic view of a C-type bicell having a structure of cathode/separator/anode/separator/cathode.
Figure 4:
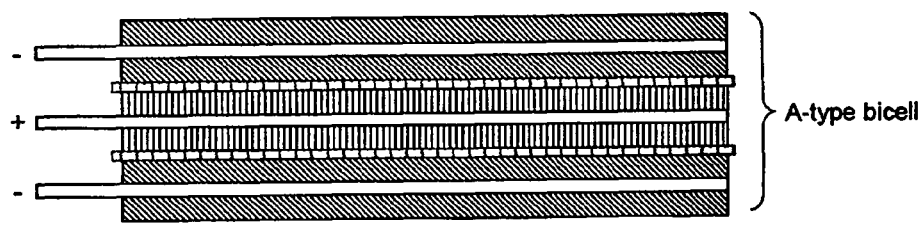
FIG. 4 is a schematic view of an A-type bicell having a structure of anode/separator/cathode/separator/anode.
Figure 5:
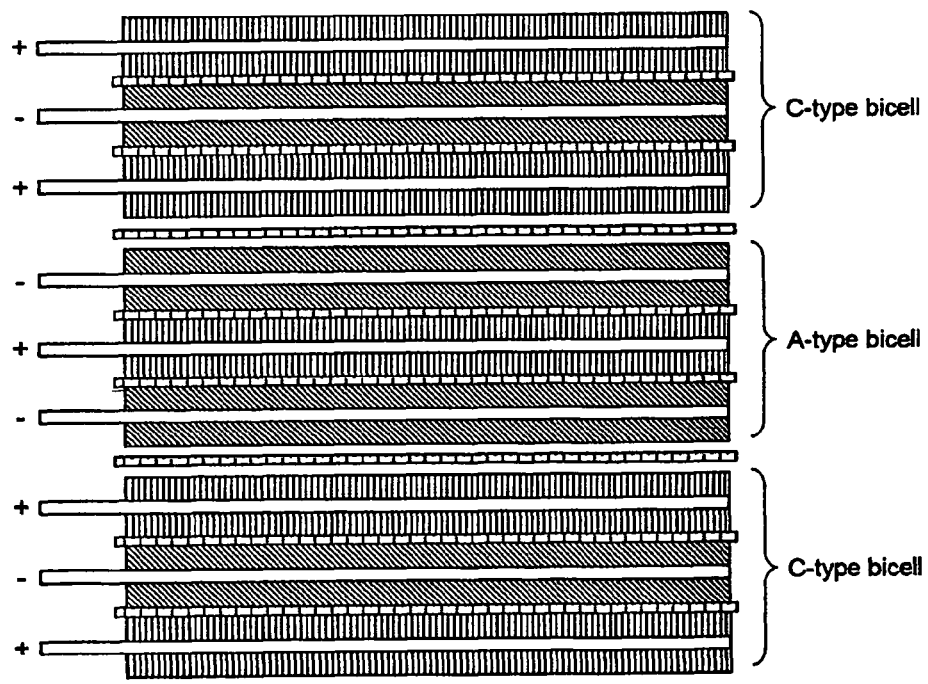
FIG. 5 is a schematic view of an exemplary battery cell, as constructed using bicells of FIGS. 3 and 4.

The bicell is a unit cell having identical electrodes on both ends of the electrode assembly, and is subdivided into a C-type bicell in which the electrodes positioned on both ends of the electrode assembly are cathodes and an A-type bicell in which the electrodes positioned on both ends of the electrode assembly are anodes. The C-type bicell may be fabricated in the form of cathode/separator/anode/separator/cathode/separator/anode/separator/cathode using a basic structure of cathode/separator/anode/separator/cathode. On the other hand, the A-type bicell may be fabricated in the form of anode/separator/cathode/separator/anode/separator/cathode/separator/anode using a basic structure of anode/separator/cathode/separator/anode. FIG. 3 shows a schematic view of a C-type bicell having a structure of cathode/separator/anode/separator/cathode, whereas FIG. 4 shows a schematic view of an A-type bicell having a structure of anode/separator/cathode/separator/anode. Therefore, one battery cell can be made by alternate and sequential arrangement of the C-type bicell and A-type bicell, and FIG. 5 shows an exemplary structure of such a battery cell configuration. There is no particular limit to the number of times in the alternate arrangement of the bicells.

Therefore, the secondary battery in accordance with the present invention may comprise a battery cell composed of two or more full cells and a battery cell composed of a combination of two or more C-type/A-type bicells. More preferred is the former battery cell.

Since the secondary battery of the present invention creates two or more voltage differences by the unit electrode assemblies having a different configuration as discussed above, a range of the voltage differences is not particularly limited and therefore may be set to within a range of 3.35 to 3.95 V, for example.

When it is desired to provide two different voltages at the same time, such a purpose, e.g. two different voltages having a voltage difference of 1.0 V therebetween, can be simultaneously provided with a single battery, for example, by stacking a plurality of full cells ($FC_1$) having an operation voltage of 2.5 V and full cells ($FC_2$) having an operation voltage of 3.5 V, and installing, on the outside of the battery case, the cathode and anode terminals connected to the full cells ($FC_1$), and the cathode and anode terminals connected to the full cells ($FC_2$), respectively.

Figure 6:
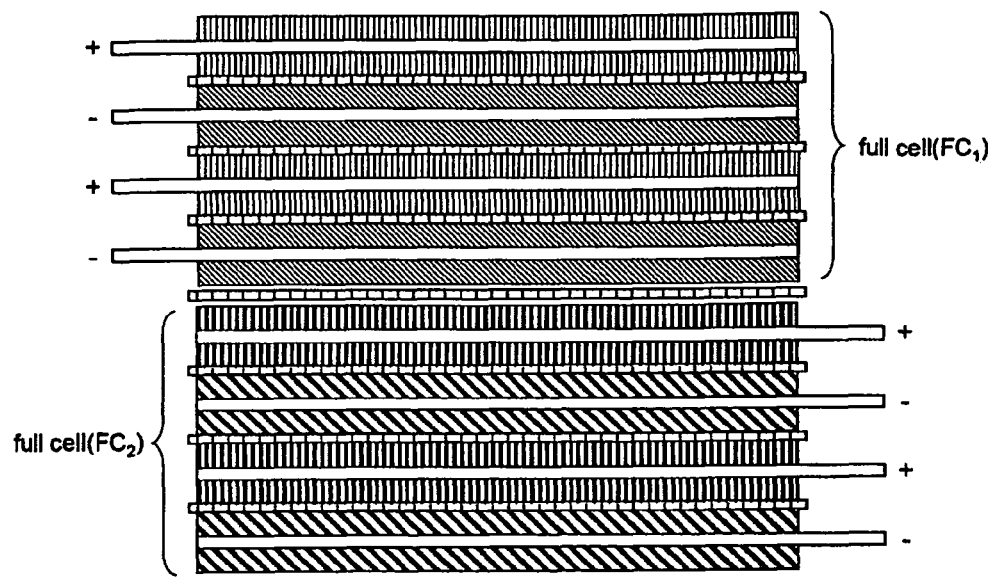
FIG. 6 is a schematic view of a battery cell composed of two full cells ($FC_1$, $FC_2$) having a different composition of active materials, according to one embodiment of the present invention.

FIG. 6 shows a schematic view of an exemplary battery cell in accordance with the present invention, which is composed of two full cells ($FC_1$, $FC_2$) having a different composition of active materials, as mentioned above.

The unit electrode assemblies have a structure where a cathode or anode, prepared by application of the active material to both sides of an electrode current collector, binds to the corresponding anode or cathode with the interposition of the separator therebetween.

In the present invention, the voltage difference is created according to the corresponding unit electrode assemblies by configuring to ensure that the cathode active material and/or the anode active material in the cathode and anode constituting the unit electrode assembly have a different composition than that of the cathode active material and/or the anode active material of other unit electrode assemblies. For example, it is possible to fabricate a battery with simultaneous provision of two different voltages by the combination of one or more unit electrode assemblies (E1) using the cathode active material (CA1) and the anode active material (AA1) with one or more unit electrode assemblies (E2) using the cathode active material (CA2) and the anode active material (AA2). Further, a combination may be possible in which the unit electrode assembly (E1) uses the cathode active material (CA1), the unit electrode assembly (E2) uses the cathode active material (CA2), and the anode active material (AA1) is the same, and vice versa. Preferably, the unit electrode assembly is configured to have a structure in which the kinds of cathode active materials are different while using the same kind of the anode active material.

The secondary battery of the present invention is preferably a lithium secondary battery. In this case, the cathode active materials may be selected from active materials having a potential difference of 3.4 to 4.0 V relative to lithium, whereas the anode active materials may be selected from active materials having a potential difference of 0 to 1.6 V relative to lithium.

When the unit electrode assembly (E1) and the unit electrode assembly (E2) are used in the number of two or more, respectively, these electrode assemblies may be arranged by alternate arrangement having a sequentially and alternately arranged structure of electrode assembly units, block arrangement having a co-stacked structure of the same kinds of unit electrode assemblies, random arrangement having a randomly stacked structure of electrode assembly units, or the like. More preferred are the alternate arrangement and the block arrangement.

Figure 7:
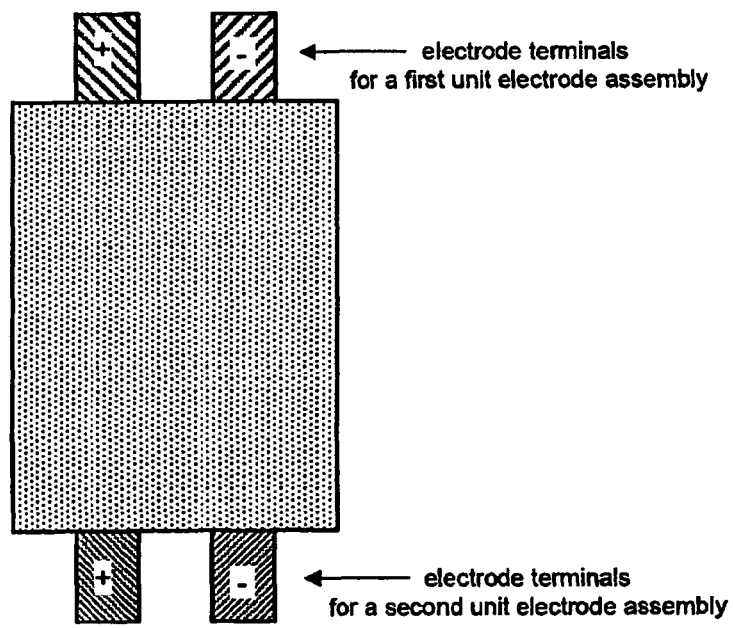
FIG. 7 is a schematic view of a secondary battery according to one embodiment of the present invention, wherein a cathode terminal and an anode terminal of a first unit electrode assembly are installed on the top of a battery case, and a cathode terminal and an anode terminal of a second unit electrode assembly are installed on the bottom of a battery case.

Further, the present invention involves installation of different electrode terminals on the outside of the battery case, depending upon the kinds of the unit electrode assemblies, i.e. voltages. For example, the cathode and anode terminals of the unit electrode assembly (E1) may be installed on the top of the battery case, and the cathode and anode terminals of the unit electrode assembly (E2) may be installed on the bottom of the battery case. An exemplary configuration of such an electrode assembly is shown in FIG. 7. Where appropriate, the cathode and anode terminals of further electrode assemblies (for example, a third electrode assembly and a fourth electrode assembly) may be additionally installed on both lateral sides of the battery case.

Alternatively, the respective cathode terminals of the unit electrode assembly (E1) and the unit electrode assembly (E2) may be installed on the top of the battery case in a spaced state from one another, and the respective anode terminals of the unit electrode assemblies may be installed on the bottom of the battery case in a spaced state from one another. The installation of the electrode terminals may also be made on lateral sides of the battery case, and therefore various configurations may be achieved based on such installation modes.

In the secondary battery in accordance with the present invention, configuration of the full cell or bicell into the electrode assemblies may be made in various manners. For example, the stacking manner may be employed which is disclosed in Korean Patent Application Publication Nos. 2001-82058 A1, 2001-82059 A1 and 2001-82060 A1, assigned to the present applicant, the disclosures of which are incorporated by reference in their entireties.

Hereinafter, individual components necessary for the construction of the secondary battery in accordance with the present invention will be described in more detail.

The cathode in the full cell or bicell is, for example, fabricated by applying a mixture of a cathode active material, a conductive material and a binder to a cathode current collector, followed by drying. If desired, the mixture may further include a filler.

The cathode current collector is generally fabricated to have a thickness of 3 to 500 μm. There is no particular limit to materials for the cathode current collector, so long as they have high conductivity without causing chemical changes in the fabricated battery. As examples of materials for the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

Examples of the cathode active material that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $V_2O_5$ and $Cu_2V_2O_7$; Ni-site type lithiated nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$) or Formula $Li_2Mn_3MO_8$ (M=Fe, Co, Ni, Cu or Zn); $LiMn_2O_4$ wherein a portion of Li is substituted with alkaline earth metal ions; disulfide compounds; $Fe_2(MoO_4)_3$; $LiFe_3O_4$, etc.

The conductive material is typically added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding between the electrode active material and the conductive material, and in binding of the electrode active material to the current collector. The binder is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode is fabricated by applying an anode material to an anode current collector, followed by drying.

The anode current collector is generally fabricated to have a thickness of 3 to 500 μm. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesion to the anode active material. In addition, the anode current collector may be used in various forms including films, sheets, foils, nets, porous structures, foams and non-woven fabrics.

As examples of the anode materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 < x \leq 1$; $1 \leq y \leq 3$; and $1 \leq z \leq 8$); lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of a non-aqueous electrolyte and lithium. As the non-aqueous electrolyte, a non-aqueous electrolytic solution, an organic solid electrolyte or an inorganic solid electrolyte may be utilized.

As examples of the non-aqueous electrolytic solution that can be used in the present invention, mention may be made of aprotic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiB_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following Examples. These examples are provided only for illustrating the present invention and should not be construed as limiting the scope and spirit of the present invention.

Example 1

A lithium manganese oxide having a composition of $Li_{1.1}Al_{0.1}Mn_{1.8}O_4$ as a cathode active material, carbon black and PVDF [Poly(vinylidene fluoride)] as a binder in a weight ratio of 85:10:5 were mixed in NMP as an organic solvent to thereby prepare a slurry. The resulting slurry was applied to both sides of aluminum (A1) foil having a thickness of 20 μm and dried to fabricate a cathode (CA1). The thus-fabricated cathode (C1) has a potential difference of about 4.0 V relative to lithium.

Further, using a lithium nickel cobalt manganese composite oxide having a composition of $LiNi_{1/3}Mn_{1/3}Co_{1/3}O_2$ as a cathode active material, a cathode (CA2) was fabricated according to the same manner as described above. The thus-fabricated cathode (C2) has a potential difference of about 3.75 V relative to lithium.

Spherical artificial graphite powder having a high degree of crystallization and an average particle size of 12 μm and PVDF as a binder in a weight ratio of 90:10 were mixed in NMP to thereby prepare a slurry. The resulting slurry was applied to copper (Cu) foil having a thickness of 10 μm, dried and roll-pressed to a thickness of 60 μm to thereby fabricate an anode (AA1). The thus-fabricated anode (A1) has a potential difference of 0.05 V relative to lithium.

The thus-fabricated cathode (C1) and anode (A1) were used to fabricate a C-type bicell (CB1) having a structure of C1-A1-C1 and an A-type bicell (AB1) having a structure of A1-C1-A1, respectively, and the cathode (C2) and anode (A1) were used to fabricate a C-type bicell (CB2) having a structure of C2-A1-C2 and an A-type bicell (AB2) having a structure of A1-C2-A1, respectively. Then, the bicells were stacked in the arrangement of CB1-AB1-CB2-AB2 with the disposition of separators such that electrode terminals between the bicells were in the opposite direction, thereby fabricating an electrode assembly. A 1M $LiPF_6$ EC/DEC solution was used as a battery electrolyte.

Finally, electrode taps of two bicells (CB1, AB1) were welded to the cathode and anode lead (E1), and electrode taps of two bicells (CB2, AB2) were welded to the cathode and anode lead (E2), thereby forming two kinds of electrode terminals. Then, the resulting electrode assembly structure was sealed in a pouch-type case made of an aluminum laminate sheet to complete a battery.

The thus-fabricated battery was subjected to charge/discharge cycling 5 times, and voltages at the electrode terminals (E1, E2) were measured at 50% SOC (State of charge) of the battery. As a result, E1 exhibited 3.95 V, and E2 exhibited 3.73 V, thus representing a different electric potential therebetween.

Example 2

A bicell was fabricated in the same manner as in Example 1, except that a cathode (C3) was constructed using a lithium iron phosphate having a composition of $LiFePO_4$ as a cathode active material. A battery was fabricated such that the cathode and anode lead (E3) in the stacked bicell of Example 1 is laterally exposed. Charge/discharge cycling was repeated and an electric potential of E3 was measured at 50% SOC. As a result, E3 exhibited 3.35 V, thus achieving the purpose that a single battery provides three different electric potentials.

INDUSTRIAL APPLICABILITY

As apparent from the above description, a stacked-type battery in accordance with the present invention can be usefully employed in devices requiring two or more different operation voltages by simultaneously imparting two or more voltages from a single battery. Further, a series connection of electrode terminals can also provide a high-operation voltage.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising a battery cell formed by stacking: 1) a plurality of full cells having a structure of cathode/separator/anode, or 2) a plurality of bicells having a structure of cathode/separator/anode/separator/cathode or anode/separator/cathode/separator/anode, as unit electrode assemblies;

wherein (i) a cathode active material or (ii) an anode active material or (iii) a cathode active material, and an anode active material in two or more of the unit electrode assemblies are configured to have a different composition to induce a voltage difference and separate electrode terminals are installed in a battery case according to the voltage difference to thereby simultaneously provide two or more voltages by a single battery.

2. The lithium secondary battery according to claim 1, wherein the battery cell comprises two full cells each having a different composition of an active material.

3. The lithium secondary battery according to claim 1, wherein the battery cell comprises a combination of two bicells each having a different composition of an active material.

4. The lithium secondary battery according to claim 1, wherein the voltage difference is set within the range of 3.35 to 3.95 V.

5. The lithium secondary battery according to claim 1, wherein the cathode active materials is selected from active materials having a potential difference of 3.4 to 4.0 V relative to lithium.

6. The lithium secondary battery according to claim 1, wherein the anode active material is selected from active materials having a potential difference of 0 to 1.6 V relative to lithium.

7. The lithium secondary battery according to claim 1, wherein the battery cell comprises first and second unit electrode assemblies, wherein cathode and anode terminals of the first unit electrode assembly are installed on a top of the battery case, and cathode and anode terminals of the second unit electrode assembly are installed on a bottom of the battery case, wherein the top and the bottom are opposite ends of the battery case.

8. The lithium secondary battery according to claim 7, wherein the battery cell further comprises third and fourth unit electrode assemblies, wherein cathode and anode terminals of the third and the fourth unit electrode assemblies are additionally installed on respective lateral sides of the battery case.

9. The lithium secondary battery according to claim 1, wherein the battery cell comprises first and second unit electrode assemblies, respective cathode terminals of the first and second unit electrode assemblies are installed in a spaced state from one another on a top of the battery case, and respective anode terminals of the first and second unit electrode assemblies are installed in a spaced state from one another on a bottom of the battery case, wherein the top and the bottom are opposite ends of the battery case.

* * * * *

UNITED STATES PATENT AND TRADEMARK OFFICE
CERTIFICATE OF CORRECTION

PATENT NO.        : 8,119,274 B2
APPLICATION NO.   : 12/308318
DATED             : February 21, 2012
INVENTOR(S)       : Hey Woong Park et al.

It is certified that error appears in the above-identified patent and that said Letters Patent is hereby corrected as shown below:

In the Claims

Claim 5, Column 10, line 23, "materials" should read -- material --.

Signed and Sealed this
Twenty-seventh Day of August, 2013

Teresa Stanek Rea
*Acting Director of the United States Patent and Trademark Office*